United States Patent
Kurashige

(10) Patent No.: US 8,108,605 B2
(45) Date of Patent: Jan. 31, 2012

(54) DATA STORAGE SYSTEM AND CACHE DATA—CONSISTENCY ASSURANCE METHOD

(75) Inventor: Takehiko Kurashige, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 116 days.

(21) Appl. No.: 12/752,844

(22) Filed: Apr. 1, 2010

(65) Prior Publication Data

US 2010/0262771 A1 Oct. 14, 2010

(30) Foreign Application Priority Data

Apr. 13, 2009 (JP) .................................. 2009-097021

(51) Int. Cl.
*G06F 12/12* (2006.01)
(52) U.S. Cl. .......................... 711/114; 711/113; 711/141
(58) Field of Classification Search .......................... None
See application file for complete search history.

(56) References Cited

U.S. PATENT DOCUMENTS

| | | |
|---|---|---|
| 2007/0168602 A1 | 7/2007 | Takai et al. |
| 2008/0016285 A1 * | 1/2008 | Kaneko et al. ................. 711/141 |
| 2008/0270704 A1 * | 10/2008 | He et al. ......................... 711/129 |
| 2008/0276040 A1 * | 11/2008 | Moritoki ........................ 711/113 |

FOREIGN PATENT DOCUMENTS

| | | |
|---|---|---|
| JP | 1-288940 | 11/1989 |
| JP | 2-037446 | 2/1990 |
| JP | 04-170625 | 6/1992 |
| JP | 06-282386 | 10/1994 |
| JP | 2001-331475 | 11/2001 |
| JP | 2007-193448 | 8/2007 |

OTHER PUBLICATIONS

Japanese Patent Application No. 2010-152288; Final Notice of Rejection; Mailed Jan. 18, 2011 (English Translation).
Japanese Patent Application No. 2010-152288; Notice of Reasons for Rejection; Mailed Oct. 26, 2010 (English Translation).
Japanese Patent Application No. 2010-152288, Notice of Reasons for Rejection, mailed Oct. 20, 2010, (English Translation).

* cited by examiner

*Primary Examiner* — Than Nguyen
(74) *Attorney, Agent, or Firm* — Blakely, Sokoloff, Taylor & Zafman LLP

(57) ABSTRACT

According to one embodiment, a data storage system includes a controller which accesses a first storage device using a first module on startup and accesses the first storage device using a second module after the startup. The first module records, when the write-target data is written to the first storage device, trace information indicating the write command in a second storage device. The second module determines, when taking over a reception of a command instructing writing/reading of data from the first module, whether or not unupdated data to be updated as a result of a writing of the first module is cached in the second storage device based on the trace information, and invalidates a data block including the unupdated data when the unupdated data is cached.

12 Claims, 4 Drawing Sheets

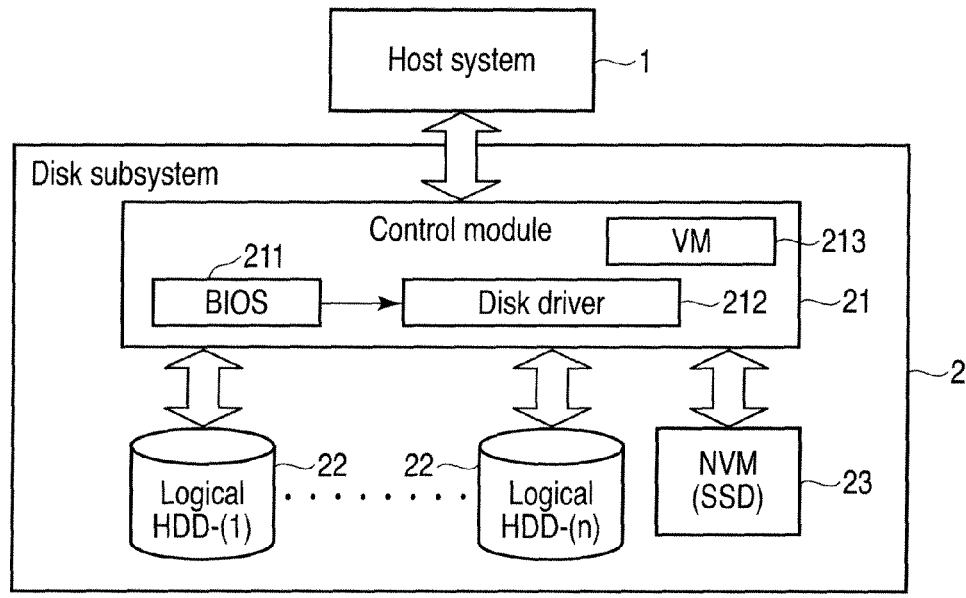
F I G. 1
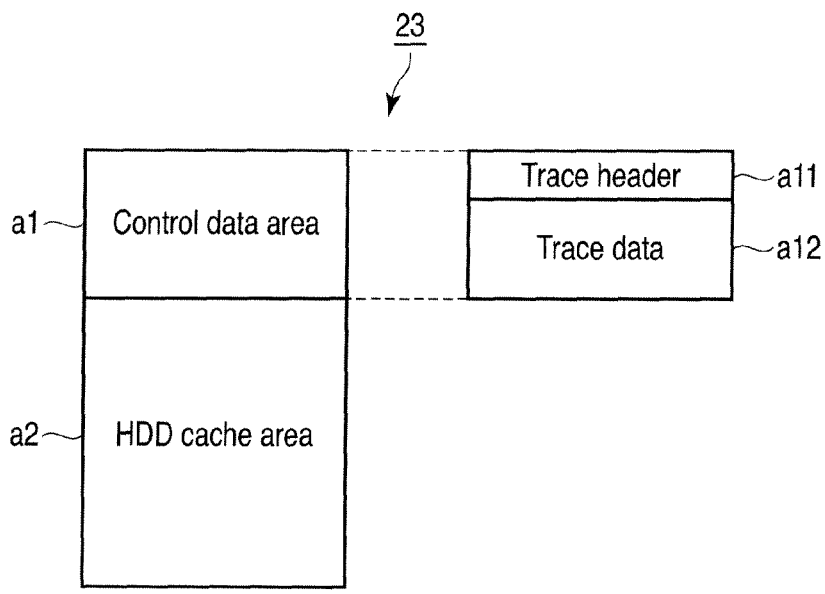
F I G. 2

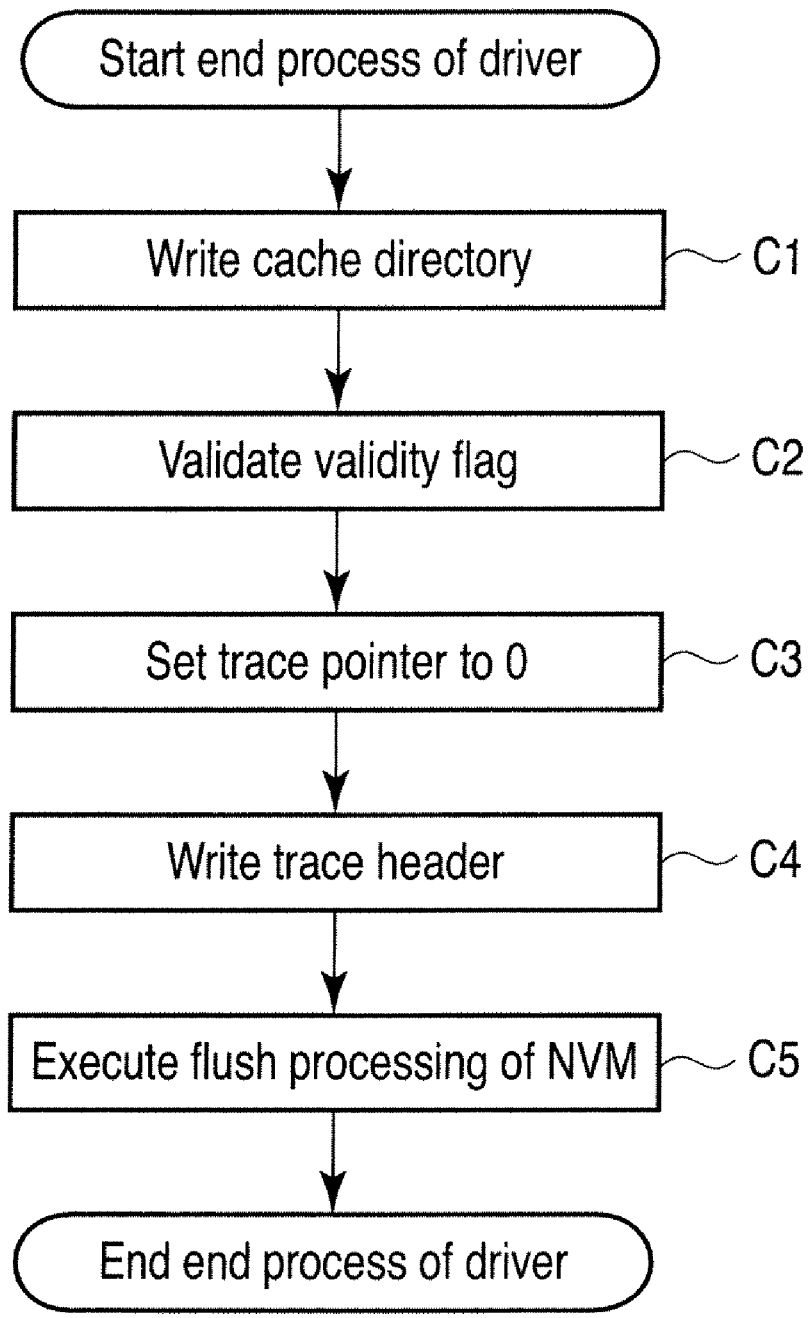
F I G. 5

US 8,108,605 B2

DATA STORAGE SYSTEM AND CACHE DATA—CONSISTENCY ASSURANCE METHOD

CROSS-REFERENCE TO RELATED APPLICATIONS

This application is based upon and claims the benefit of priority from Japanese Patent Application No. 2009-097021, filed Apr. 13, 2009, the entire contents of which are incorporated herein by reference.

BACKGROUND

1. Field

One embodiment of the invention relates to a cache data-consistency assurance technology suitable for, for example, a disk system comprising one or more hard disk drive (HDD).

2. Description of the Related Art

Recently, computerization of work has been developed in various categories of business. It is common in office environments that each employee uses his/her personal computer (PC) for conducting business, and shared server computers connected to PCs via a local area network (LAN) are used for managing business data integratedly.

In a server computer used for the above purpose, it is important to ensure consistency of data that is read and written (and also updated) by a plurality of employees. Various inventions relating to mechanism for ensuring data consistency have been thus proposed so far (e.g., Jpn. Pat, Appln, KOKAI Publication No. 4-170625).

In a server computer used in the above purpose, a disk system in which, for example, increase in disk capacity with low cost is realized by providing a plurality of HDDs is often applied as an external storage device.

Also, recently, a PC mounting a solid-state drive (SDD), which employs a non-volatile semiconductor memory and serves as a recording medium, instead of an HDD has appeared. The SSD is faster in the data reading speed when compared with an HDD. Therefore, it is possible to improve response performance when a plurality of SSDs are used to configure a disk system. However, a disk system of this configuration becomes inevitably expensive and thus not practical.

As a compromise in consideration of cost, it may be also possible to improve response performance by configuring a disk system using, for example, both a HDD and an SSD and utilizing the SDD as a cache for the HDD. In this case, however, a new method for ensuring cache data consistency is required under circumstances in which the two types of storage device are controlled by different drivers depending on, for example, operation modes.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary diagram showing a configuration of a data storage system (disk subsystem) according to one embodiment of the present invention.

FIG. 2 is an exemplary diagram showing a logical allocation example of a storage area of a non-volatile memory in the disk subsystem according to the embodiment.

FIG. 5 is an exemplary flowchart showing a procedure relating to data access with respect to the logical HDD when the disk driver in the disk subsystem according to the embodiment is finished.

DETAILED DESCRIPTION

Figure 3:
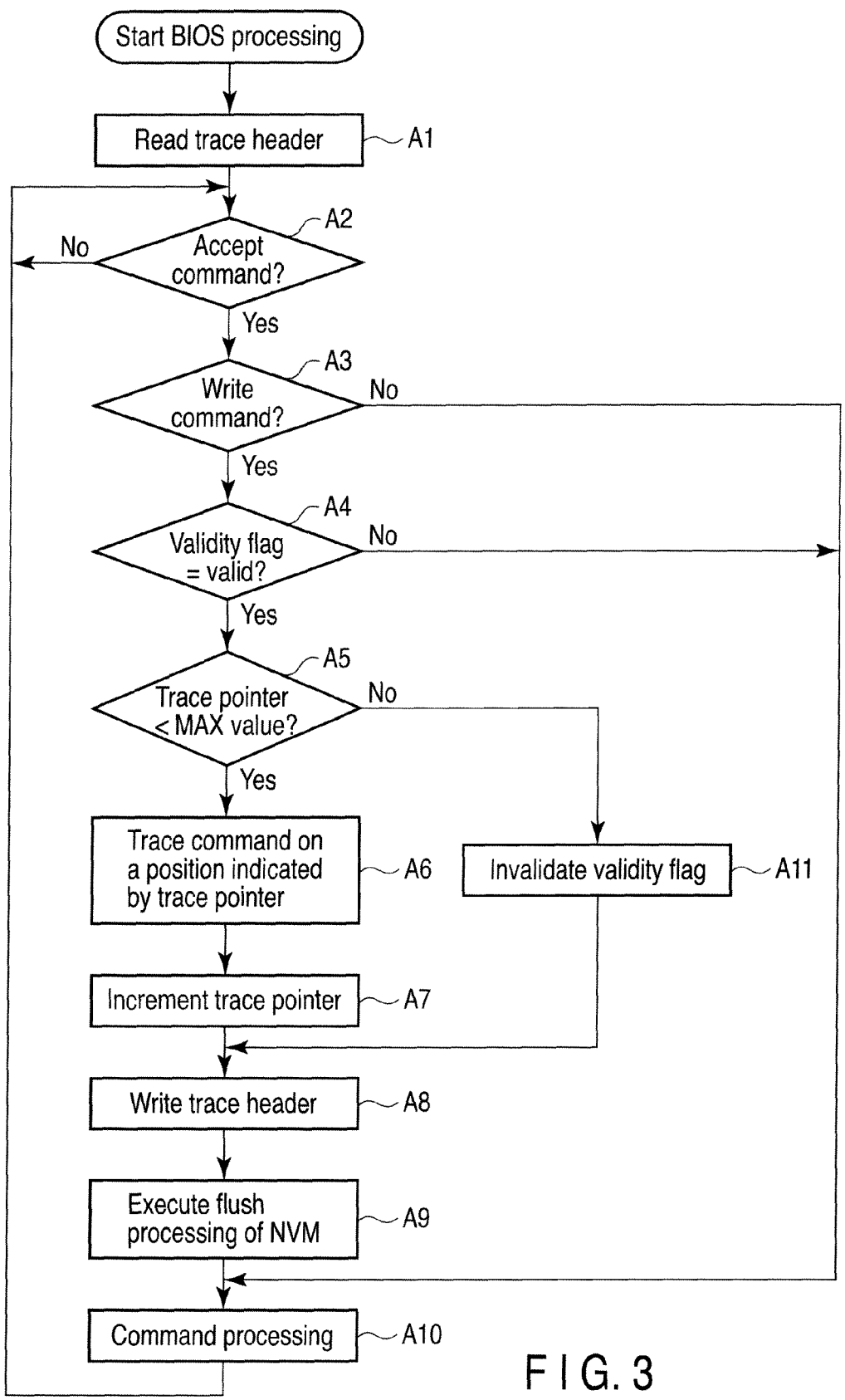
FIG. 3 is an exemplary flowchart showing a procedure relating to data access with respect to a logical HDD of BIOS in the disk subsystem according to the embodiment.

Various embodiments according to the invention will be described hereinafter with reference to the accompanying drawings. In general, according to one embodiment of the invention, a data storage system includes a controller which accesses a first storage device using a first module on startup and accesses the first storage device using a second module after the startup. The first module records, when the write-target data is written to the first storage device, trace information indicating the write command in a second storage device. The second module determines, when taking over a reception of a command instructing writing/reading of data from the first module, whether or not unupdated data to be updated as a result of a writing of the first module is cached in the second storage device based on the trace information, and invalidates a data block including the unupdated data when the unupdated data is cached.

FIG. 1 is an exemplary diagram showing a configuration of a data storage system according to an embodiment of the present invention. This data storage system is realized as a disk subsystem 2 for storing a large volume of data used by a host system 1. According to the embodiment, the disk subsystem 2 is connected with the host system 1 via a data bus, and thereby constructing one computer system.

As shown in FIG. 1, the disk subsystem 2 includes a control module 21, a plurality of logical hard disk drives (HDDs) 22, and a non-volatile memory (NVM) 23. According to the embodiment, an SSD is applied as the NVM 23.

The control module 21 is a brain that controls performance of the disk subsystem 2. The control module 21 accepts write commands for writing data to the logical HDD 22 and read commands for reading data from the logical HDD 22, which are issued by the host system 1. In response to these commands, the control module 21 performs drive control of the logical HDD 22 and the NVM 23, in order for effectively processing data access to the logical HDD 22 while utilizing the NVM 23 (whose access speed is faster than that of the logical HDD 22) as a cache.

The control module 21 includes a basic input/output system (BIOS) 211 and a disk driver 212. For example, during a period from loading of an operating system (OS), which performs resource management of the entire computer system, until starting operation of the OS in the host system 1, data access to the logical HDD 22 of the disk subsystem 2 is controlled by the BIOS 211. After the OS is started, the data access to the logical HDD 22 is controlled by, instead of the BIOS 211, the disk driver 212 operating under the OS.

While the disk driver 212 uses the NVM 23 as a cache when performing the data access to the logical HDD 22, the BIOS 211 does not use the NVM 23 as a cache when performing the data access. It is because installing a complex control module for using the NVM 23 as a cache in the BIOS 211 will inevitably significantly increases code quantity. Consistency of cache data will not be therefore ensured without some measures (e.g., in the case wherein the BOIS 211 performs writing such as updating cached data).

Under the circumstances, the disk subsystem 2 according to the embodiment is constructed by using the logical HDDs 22 which are inexpensive and low-speed, and installing the SDD 23, which is high-speed, as a shared cache for the logical HDD 22. Further, the control module 21 of the disk subsystem 2 includes a mechanism for ensuring consistency of cache data of the SSD even under the situation where the SSD is accessed both by the BIOS 211 and the disk driver 212. More specifically, the disk subsystem 2 includes a mechanism wherein the BIOS 211 (with small code quantity) and the disk driver 212 work in cooperation for improving response performance without significantly increasing cost, thereby realizing data consistency assurance. This mechanism will be explained in detail.

The control module 21 includes a volatile memory (VM) 213 such as a DRAM, which is used as a work area for the data access. The logical HDD 22 is redundant array of inexpensive disks (RAID), in which a single HDD or a plurality of HDDs are connected in parallel for improving failure-resistant performance. A single HDD and RAID may be installed together for configuring the logical HDDs 22 of the disk subsystem 2. The host system 1 individually recognizes each of the logical HDDs 22, and issues data access commands for each of the HDDs 22 to the control module 21 of the disk subsystem 2.

FIG. 2 is an exemplary diagram showing a logical allocation example of a storage area of a non-volatile memory in the disk subsystem according to the embodiment.

As shown in FIG. 2, the control module 21 uses a storage area of the NVM 23 in two ways: a control data area "a1", and an HDD cache area "a2".

The HDD cache area "a2" is an area used for keeping a part of data of the logical HDD 22, that is to say, an area used as a shared cache. A so-called caching method, which is for keeping a part of data of the logical HDD 22 on the HDD cache area "a2", is not limited to a specific method and any existing methods may be applicable. Also, the HDD cache area "a2" stores a cache directory and the like, which indicates data kept in the HDD cache area "a2" corresponds to which data of which logical HDDs 22. The cache directory is to be loaded to the VM 213 and used, and is to be arbitrarily written back to the HDD cache area "a2" at a predetermined timing.

The control data area "a1" is an area for keeping various control data for ensuring consistency of cache data in the HDD cache area "a2" (of the NVM 23) relating to the logical HDDs 22, which is accessed from two ways, such as the BIOS 211 and the disk driver 212. The control data area "a1" stores a trace header "a11" and trace data "a12", which are to be described later.

Next, cooperative performance of the BIOS 211 and the device driver 212 for ensuring consistency of cache data in the HDD cache area "a2" will be explained.

Firstly, a basic operating principle relating to data access to the logical HDDs 22 of the BIOS 211 (on starting or rebooting the computer system) will be explained.

When the BIOS 211 receives a command requiring data access to the logical HDD 22 from the host system 1, the BIOS 211 checks whether the received command is a command for reading data from the logical HDD 22 (read command) or a command for writing data to the logical HDD 22 (write command). If the command is a read command, the BIOS reads required data from the logical HDD 22 (regardless of whether or not the read-target data is being cached in the NVM 23), and transmits the data to the host system 1. That is to say, as for the read command, the BIOS 211 executes usual command processing.

In the case of the write command, on the other hand, the BIOS 211 writes the required data to the logical HDD 211, and also records the write command in the control data area "a1" of the NVM 23 as trace data "a2". Even if data to be updated as a result of this writing is included in the HDD cache area "a2" of the NVM 23, the BIOS 211 itself does not execute the update. That is to say, what is required for the BIOS 211 is to include simple code for tracing write commands with respect to the logical HDD 22 to the NVM 23, as a module for ensuring consistency of cache data in the NVM 23. In other words, the BIOS 211 does not include any complex code for determining whether any cache hit is generated, or executing replacement of cache data for improving hit ratio, regardless of whether read commands or write commands.

Every time the BIOS 211 executes a write command (trace data), it increments a trace pointer indicating a position at which the next trace data is to be written. The trace pointer is included in the trace header "a11". When a need for further tracing a write command arises even after a value of the trace pointer reaches a predetermined value, the BIOS 211 does not execute tracing of the write command and any further write commands. In other words, the BIOS 211 executes tracing of write commands within a range of predetermined capacity. The trace header "a11" also includes a validity flag. When the above-mentioned overflow occurs and tracing of a write command is stopped, this validity flag is set to invalid. In the case where the BIOS 211 reads the trace header "a11" from the control data area "a1" of the NVM 23 at the timing when the BIOS 211 starts up (that is to say, before the BIOS 211 accepts a command from the host system 1) and the validity flag included in the trace header "a11" is already set to invalid, the BIOS 211 does not execute tracing of write commands from the beginning.

Also, every time the BIOS 211 accepts a write command from the host system 1 and writes data to the NVM 23 (writing the trace data "a12" of the control data area "a1" and updating the trace data "a11" [incrementing the trace pointer or updating the validity flag]), the BIOS 211 requires the NVM 23 to execute flush processing. As a result, content of writing can be reflected on a recording medium each time, even if the NVM 23 includes a write-back cache.

Next, a basic operating principle relating to data access to the logical HDDs 22 on starting the disk driver 212 (when the OS is started and it takes over access control to the logical HDDs 22, from the BIOS 211) will be explained.

The disk driver 212 reads, on startup, the trace header "a11" from the control data area "a1" of the NVM 23. Then, the disk driver 212 checks whether the validity flag is set to valid or invalid. If the validity flag is set to invalid, the disk driver 212 initializes the cache directory, for the purpose of invalidating cache data in the HDD cache area "a2" of the NVM 23. As a result, all commands (e.g., read commands) which are issued by the host system 1 at the beginning, are to be processed by being read from the logical HDDs 22. Due to this mechanism, consistency assurance of the cache data can be maintained.

On the other hand, when the validity flag is valid, the disk driver 212 loads the cache directory (stored in the HDD cache area "a2" of the NVM 23) into the VM 213, and then traces trace data "a12" (recorded in the control data area "a1" of the NVM 23) for checking whether there is any corresponding data, and when there is, invalidates a block including the corresponding data on the cache directory. Due to this process, even when unupdated data corresponding to the data which is written to the logical HDD 22 by the BIOS 211 is being cached, the unupdated data is prevented from being read in response to a subsequent read command and consistency assurance of cache data is thereby maintained.

When the validity flag is valid, the disk driver 212 writes the trace header "a11" including the validity flag that is set to invalid to the NVM 23 after invalidation of the block on the cache directory described above. And then, the disk driver 212 requires the NVM 23 to execute flush processing. Reason for requiring the flush processing is similar to the above-mentioned case of the BIOS 211, that is to say, to securely reflect written content at the time on the recording medium even if the NVM 23 includes a write-back cache. Due to this process, the validity flag of the trace header "a11" is to indicate invalid, after the startup of the disk driver 212.

Next, a basic operating principle relating to data access to the logical HDDs 22 when the disk driver 212 is finished (when the computer system follows regular steps for shutting down or rebooting) will be explained.

The disk driver 212, on finishing, executes write processing to the NVM 23 for storing the cache directory in the VM 213 in the HDD cache area "a2" of the NVM 23. Then, the disk driver 212 sets the validity flag of the trace header "a11" to valid and also resets the trace pointer in the trace header "a11" to an initial value (0). The disk driver subsequently requires the NVM 23 to execute flush processing, for the same purpose mentioned above.

That is to say, the validity flag of the trace header "a11" recorded in the control data area "a1" of the NVM 23 indicates valid, only when the disk driver 212 executed the finishing process. In other words, if the validity flag indicates invalid, it means that the computer system is shut down without the finishing process to be performed by the disk driver 212, or the BIOS 211 failed to completely trace the trace data "a12" due to an overflow. In either case, it is possible that consistency of data being cached in the HDD cache area "a2" is lost. As mentioned above, the disk driver 212 initializes the cache directory in order to invalidate the cache data on the HDD cache area "a2" of the NVM 23, when the validity flag indicates invalid on startup.

According to the disk subsystem 2 of the embodiment, the validity flag in the trace header "a11" to be recorded is intervened in the control data area "a1" of the NVM 23, and the BIOS 211 works in cooperation with the disk driver 212. With this mechanism, it is possible to utilize the NVM 23 as a cache for the plurality of logical HDDs 22 only by installing a small amount of code in the BIOS 211. As a result, response performance can be improved without significantly increasing the cost, and consistency of cache data on the HDD cache area "a2" of the NVM 23 can be ensured.

The disk driver 212, when it accepts, from the host system 1, a write command or read command with respect to the logical HDD 22 after its startup, it processes the command by utilizing the NVM 23 as a cache. As for handling of cache data with respect to a write command, however, the following two methods are possible.

According to the embodiment, the SSD is used as the NVM 23. The SSD updates data by invalidating a block including unupdated data and writing a block including the updated data. Therefore, in the case where the HDD cache area "a2" is constructed by a plurality of chips and invalidation of a block including unupdated data and writing a block including updated data can be executed at the same time, the SSD is capable of updating data with high speed. Therefore, when unupdated data corresponding to data which is required to be written by a write command is being cached, a process of replacing the unupdated data with the updated data and a write process with respect to the logical HDD 22 can be executed at the same time.

On the other hand, in the case where the HDD cache area "a2" is constructed by one chip and invalidation of a block including unupdated data and writing a block including updated data can be performed only serially, response performance may be degraded. Therefore, when unupdated data corresponding to data which is required to be written by a write command is being cached, it is preferable to execute invalidation of the cached unupdated data and write process with respect to the logical HDD 22 at the same timing.

Next, a procedure relating to data access with respect to the logical HDDs 22 by utilizing the NVM 23 of the disk subsystem 2 as a cache will be explained with reference to FIG. 3, FIG. 4 and FIG. 5.

FIG. 3 is an exemplary flowchart showing a procedure relating to data access with respect to the logical HDD 22 of the BIOS 211.

The BIOS 211 firstly reads a trace header "a11" recorded in the control data area "a1" of the NVM 23 (block A1). When the BIOS 211 receives a command requiring data access to the logical HDD 22 from the host system 1 (YES in block A2), the BIOS 211 checks whether or not the received command is a write command (block A3).

If the received command is not a write command (NO in block A3), the BIOS 211 executes required command processing (regardless of whether or not caching utilizes the NVM 23) (block A10).

On the other hand, if the received command is a write command (YES in block A3), the BIOS 211 checks the validity flag of the trace header "a11" (block A4). If the validity flag indicates invalid (NO in block A4), the BIOS 211 executes the required command processing without tracing the write command (block A10).

If the validity flag indicates valid (YES in block A4), the BIOS 21 refers to a value of a trace pointer held in the trace header "a11" and checks whether or not the value reaches a predetermined maximum value (block A5). When the value of the trace pointer reaches the predetermined maximum value (NO in block A5), the BIOS 211 sets the validity flag of the trace header "a11" to invalid (block A11).

On the other hand, when the value of the trace pointer does not reach the predetermined maximum value (YES in block A5), the BIOS 211 traces the write command on the HDD cache area "a2" of the NVM 23 indicated by the trace pointer (block A6), and increments the trace pointer of the trace header "a11" (block A7).

After updating contents of the trace header "a11" in block A7 or block A11, the BIOS 211 writes the updated trace header "a11" in the NVM 23 (block A8) and requires the NVM 23 to execute flush processing (block A9). The BIOS 211 then executes the command processing required by the host system 1 (block A10).

Figure 4:
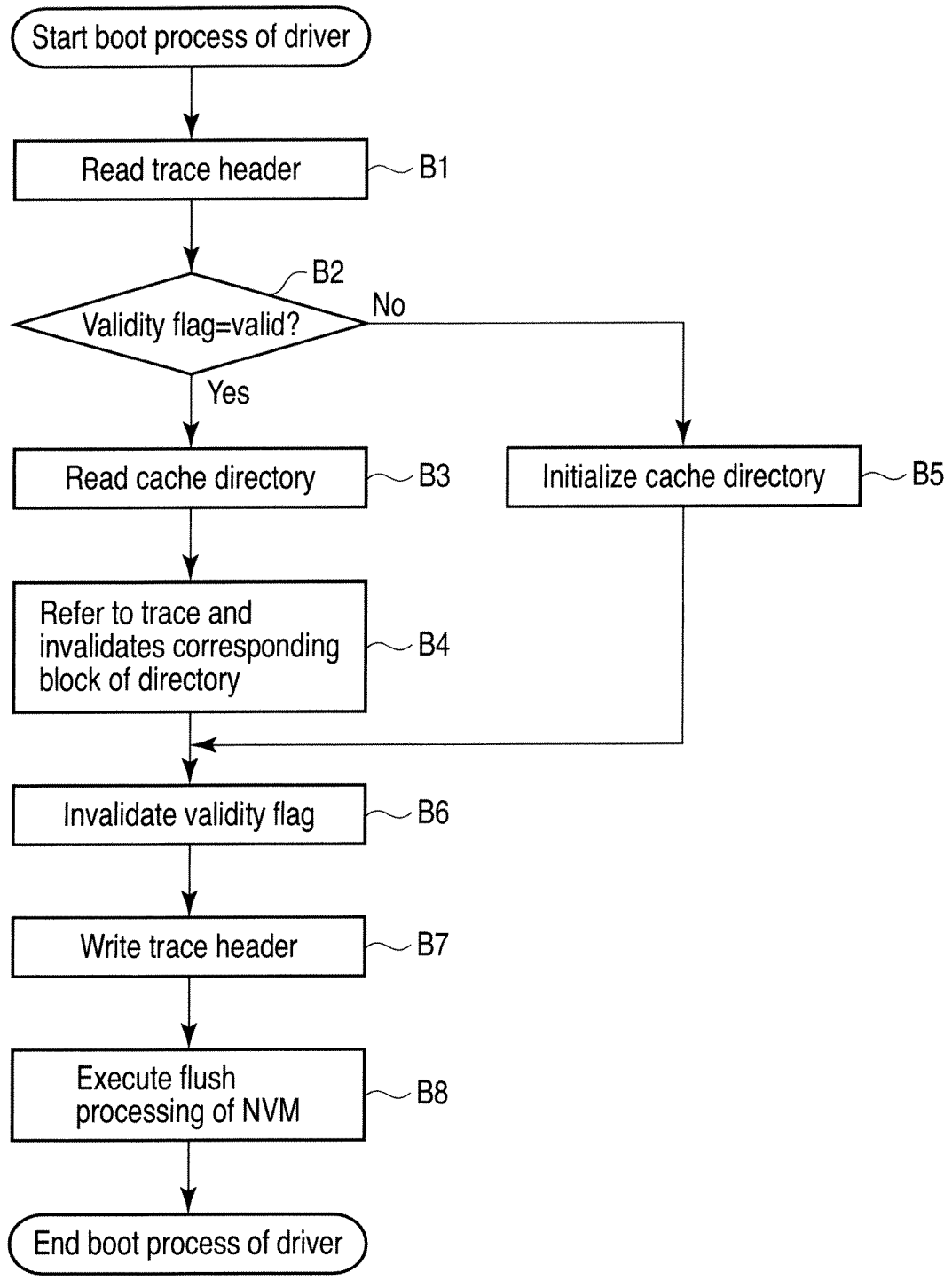
FIG. 4 is an exemplary flowchart showing a procedure relating to data access with respect to the logical HDD on startup of a disk driver in the disk subsystem according to the embodiment.

FIG. 4 is an exemplary flowchart showing a procedure relating to data access with respect to the logical HDD 22 on startup of the disk driver 212.

The disk driver 212 firstly reads the trace header "a11" recorded in the control data area "a1" of the NVM 23 (block B1). Then the disk drier 212 checks the validity flag of the trace header "a11" (block B2). If the validity flag indicates invalid (NO in block B2), the disk driver 212 initializes the cache directory for invalidating the cache data on the HDD cache area "a2" of the NVM 23 (block B5).

On the other hand, when the validity flag indicates valid (YES in block B2), the disk driver 212 loads the cache directory (which is stored in the HDD cache area "a2" of the NVM 23) into a VM 213 (block B3). The disk driver 212 then traces all trace data "a12" (recorded in the control data "a1" of the NVM 23) and checks whether or not corresponding data exists. If corresponding data exists, the disk driver 212 invalidates a block including the corresponding data on the cache directory (block B4).

Then, the disk driver 212 sets the validity flag to invalid (block B6), and writes the trace header "a11" including the invalid flag to the NVM 23 (block B7) and requires the NVM 23 to execute flush processing (block B8).

FIG. 5 is an exemplary flowchart showing a procedure relating to data access with respect to the logical HDDs 22 when the disk driver 212 is finished.

The disk driver 212 firstly executes a write process with respect to the NVM 23 in order to store the cache directory of the VM 213 in the HDD cache area "a2" of the NVM 23 (block C1). Next, the disk driver 212 sets the validity flag of the trace header "a11" to valid (block C2) and resets the trace pointer in the trace header "a11" to the initial value (0) (block C3). The disk driver 212 then executes a write process with respect to the NVM 23 in order to store the trace header "a11" in the control data area "a1" of the NVM 23 (block C4). After executing the write process, the disk driver 212 requires the NVM 23 to execute flush processing (block C5).

As explained above, the disk subsystem 2 (data storage system) has a mechanism wherein the BIOS 211 and the disk driver 212 work in cooperation. Due to this mechanism, it is possible to improve response performance of, for example, a disk system comprising one or more HDDs without significantly increasing cost, and realize data consistency assurance.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A data storage system comprising:
a first storage device;
a second storage device; and
a controller configured to gain data access to the first storage device using a first device control module on startup, and to gain data access to the first storage device using a second device control module after the startup,
wherein:
the first device control module comprises a tracer configured to record, when a write command to write data to the first storage device is received, trace information indicating the write command in the second storage device, and
the second device control module comprises
a cache-consistency assurance module configured to invalidate, when taking over the write command to write data to the first storage device or a read command to read data therefrom from the first device control module, a data block cached in the second storage device comprising data to be updated as a result of writing of data to the first storage device which is executed by the first device control module before the takeover, the data block comprising read-target data cached in the second storage device based on the trace information when the read-target data is read out of the first storage device upon receipt of the read command to read from the first storage device.

2. The system of claim 1, wherein:
the tracer is configured to record a trace header comprising a flag that indicates validity/invalidity of the trace information in the second storage device, and to invalidate the flag in the trace header while stopping recording of the rest of the trace information in the second storage device, when the amount of the trace information to be recorded on the second storage device exceeds a predetermined value, and
the cache-consistency assurance module is configured to invalidate all data blocks cached in the second storage device, when the flag in the trace header indicates invalidity.

3. The system of claim 1, wherein:
the second storage device comprises a write-back cache memory, and
the cache-consistency assurance module is configured to set, when the second device control module starts up, a flag in the trace header to be invalid after terminating invalidation of the data block cached in the second storage device and to cause the second storage device to execute a flush processing for reflecting data in the cache memory in storage media, and to set, when the second device control module terminates, the flag in the trace header to be valid and to cause the second storage device to execute the flush processing.

4. The system of claim 3, wherein the tracer does not record the trace information in the second storage device when the flag in the trace header indicates invalidity.

5. The system of claim 1, wherein the first storage device comprises at least one hard disk drive (HDD), and the second storage device comprises a solid state drive (SSD).

6. The system of claim 1, wherein the second device control module further comprises a write control module configured to execute updating of the data block cached in the second storage device comprising the data to be updated, if data update speed of the second storage device is higher than data update speed of the first storage device when data to be updated as a result of writing of data to the first storage device is cached in the second storage device.

7. The system of claim 1, wherein the second device control module further comprises a write control module configured to execute invalidation of the data block cached in the second storage device comprising data to be updated, if data update speed of the second storage device is lower than data update speed of the first storage device when data to be updated as a result of writing of data to the first storage device is cached in the second storage device.

8. A cache data-consistency assurance method of a data storage system comprising a controller configured to gain data access to the first storage device using a first device control module on startup and to gain data access to the first storage device using a second device control module after the startup, the method comprising:
causing the first device control module to record, when a write command to write data to the first storage device is received, trace information indicating the write command in the second storage device; and
causing the second device control module to invalidate, when taking over the write command to write data to the first storage device or a read command to read data therefrom from the first device control module, a data block cached in the second storage device comprising data to be updated as a result of writing of data to the first storage device which is executed by the first device control module before the takeover, the data block comprising read-target data cached in the second storage device based on the trace information when the read-target data is read out of the first storage device upon receipt of the read command to read from the first storage device.

9. The method of claim 8, wherein:
the first device control module is configured to record a trace header comprising a flag that indicates validity/invalidity of the trace information in the second storage device, and to invalidate the flag in the trace header while stopping recording of the rest of the trace information in the second storage device, when the amount of the trace information to be recorded on the second storage device exceeds a predetermined value, and
the second device control module is configured to invalidate all data blocks cached in the second storage device, when the flag in the trace header indicates invalidity.

10. The method of claim 9, wherein:
the second storage device comprising a write-back cache memory, and
the second device control module is configured to set, when the second device control module starts up, a flag in the trace header to be invalid after terminating invalidation of the data block cached in the second storage device and to cause the second storage device to execute a flush processing for reflecting data in the cache memory in storage media, and to set, when the second device control module terminates, the flag in the trace header to be valid and to cause the second storage device to execute the flush processing.

11. The method of claim 8, wherein the second device control module is configured to execute updating of the data block cached in the second storage device comprising the data to be updated, if data update speed of the second storage device is higher than data update speed of the first storage device when data to be updated as a result of writing of data to the first storage device is cached in the second storage device.

12. The method of claim 8, wherein the second device control module is configured to execute invalidation of the data block cached in the second storage device comprising data to be updated, if data update speed of the second storage device is lower than data update speed of the first storage device when data to be updated as a result of writing of data to the first storage device is cached in the second storage device.

* * * * *